(12) United States Patent
Muenkel

(10) Patent No.: US 8,709,116 B2
(45) Date of Patent: *Apr. 29, 2014

(54) FILTER DEVICE, ESPECIALLY AIR FILTER FOR AN INTERNAL COMBUSTION ENGINE

(71) Applicant: Mann+Hummel GmbH, Ludwigsburg (DE)

(72) Inventor: Karlheinz Muenkel, Oberderdingen-Flehingen (DE)

(73) Assignee: Mann+Hummel GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/793,027

(22) Filed: Mar. 11, 2013

(65) Prior Publication Data

US 2013/0186048 A1    Jul. 25, 2013

Related U.S. Application Data

(63) Continuation of application No. 13/447,596, filed on Apr. 16, 2012, now Pat. No. 8,394,160, and a continuation of application No. 12/589,526, filed on Feb. 26, 2009, now Pat. No. 8,157,880, and a continuation of application No. PCT/EP2009/052316, filed on Feb. 26, 2009.

(30) Foreign Application Priority Data

Feb. 26, 2008 (DE) .......................... 10 2008 011 186
Dec. 23, 2008 (DE) .......................... 10 2008 062 954

(51) Int. Cl.
*B01D 46/00* (2006.01)

(52) U.S. Cl.
USPC ................ 55/385.3; 55/337; 55/482; 55/498; 55/502; 55/503; 55/506; 55/481; 55/529; 123/198 E

(58) Field of Classification Search
USPC ........ 55/385.3, 337, 482, 498, 502, 503, 506, 55/481; 123/198 E
See application file for complete search history.

(56) References Cited

U.S. PATENT DOCUMENTS 8,157,880 B2 *   4/2012   Muenkel ....................... 55/385.3
8,394,160 B2 *   3/2013   Muenkel ....................... 55/385.3

FOREIGN PATENT DOCUMENTS

RU           2173572 C1      9/2001

*Primary Examiner* — Duane Smith
*Assistant Examiner* — Minh-Chau Pham
(74) *Attorney, Agent, or Firm* — James Hasselbeck

(57) ABSTRACT

A filter device (10), especially an air filter for an internal combustion engine, includes a main filter element (22) arranged in a filter housing (12). The main filter element is flown through by a fluid to be filtered. The main filter element (22) is a multi-bellows filter having nested filter bellows (32, 34). Between the filter bellows (32, 34) a flow space (44) for the fluid is formed communicating with an end face of the main filter element (22), wherein each one of the filter bellows (32, 34) is embodied as a star-shaped filter with filter folds arranged in a star shape. On at least one end face of the main filter element (22) there is a seal (36) between one of the filter bellows (32, 34) and the filter housing (12). The main filter element (22) is forced seal-tightly against the filter housing (12) by a lateral insert (38) insertable into a housing receptacle (66) of the filter housing (12), or the main filter element (22) is seal-tightly forced by means of a locking device (74) against the filter housing (12), or the main filter element (22) is sealed by means of a two-component synthetic seal (36, 96, 98) relative to the filter housing (12, 104).

21 Claims, 12 Drawing Sheets

FILTER DEVICE, ESPECIALLY AIR FILTER FOR AN INTERNAL COMBUSTION ENGINE

CROSS REFERENCE TO RELATED APPLICATIONS

This application is a Continuation of application Ser. No. 13/447,596, filed Apr. 16, 2012, issued Mar. 12, 2013 as U.S. Pat. No. 8,394,160 which is a Continuation of application Ser. No. 12/589,526, filed Feb. 26, 2009, issued Apr. 17, 2012 as U.S. Pat. No. 8,157,880. Application Ser. No. 12/589,526 claims priority to German patent application no. 102008011186.4 filed Feb. 26, 2008 and to German patent application no. 102008062954.5 filed Dec. 23, 2008. Application Ser. No. 12/589,526 claims priority to international patent application number PCT/EP2009/052316, filed Feb. 26, 2009 designating the United States of America. The entire disclosures of the above applications are incorporated herein by reference.

TECHNICAL FIELD

The invention concerns a filter device, especially an air filter for an internal combustion engine.

BACKGROUND OF THE INVENTION

EP 1 364 695 A1 discloses an air filter that is integrated into the intake manifold of an internal combustion engine in order to subject the combustion air to be supplied to the cylinders of the internal combustion engine to a filtration action. The air filter is substantially of a three-part configuration and comprises a filter element in a filter housing that is configured as an exchangeable filter cartridge through which the combustion air flows axially and that is insertable radially by means of a closable lid into the filter housing. The filter cartridge has arranged upstream thereof a cyclone preseparator that serves for separation of coarse dirt particles. Downstream of the filter cartridge there is a secondary or fine filter element that also is insertable radially into the filter housing when the lid is open. The cyclone preseparator, the filter cartridge, and the fine filter element are positioned axially sequentially behind one another and the combustion air to be filtered passes through them without deflection in the axial direction.

As a main filter element that is received in the filter cartridge, for example, wound filters are suitable that are comprised of a corrugated filter material that is wound about a core, wherein as a result of the corrugation axial flow passages are formed by the filter element that are closed of alternatingly at the end faces. Such a filter element is, for example, disclosed in U.S. Pat. No. 7,008,467 B2.

Also known are filter elements that are comprised of a star-shaped folded filter element in the form of a filter bellows whose filter folds extend in radial direction wherein the front edges of the filter folds extend in axial direction.

EP 1 494 785 B1 discloses an air filtering device and a method for its installation. An air filter with a first stage and with a prefilter with multiple centrifugal separators with a dust separating tube and a second stage with an air filter cartridge is arranged downstream of the tubular filter. The air filter cartridge comprises a Z filter medium, a sealing element extending completely about the circumference of the Z filter medium construction and having an intake flow surface and an exit flow surface. The Z filter medium comprises several intake fold passages that are open at the intake flow surface and are closed off for passage of air at the exit flow surface. Several exit fold passages are provided that are closed at the intake flow surface and are open at the exit flow surface for outflow.

The air filter comprises a housing with at least a first and a second part wherein the sealing element comprises a first side and an opposite second side as well as an outer annular surface.

The sealing element is moreover arranged between the first part and the second part of the housing in order to provide an axial sealing action.

Each of the centrifugal separators has a sidewall, an interior, and baffles. Moreover, a safety element is installed operatively in the housing behind the primary filter element at the outflow side.

The safety element comprises a frame with an outer surrounding skirt, a packing set arranged at the surrounding skirt, and a folded filter medium area arranged within the frame as well as a grip.

The packing set moreover forms a seal within the housing.

SUMMARY OF THE INVENTION

The invention has the object to provide with simple constructive measures a filter device that is characterized by a high filtration efficiency wherein the filter device should be designed to be serviced with minimal expenditure.

This object is solved according to the invention by the features of the independent claims.

According to a first embodiment of the invention a filter device has a filter element arranged in a filter housing which filter element is a multi-bellows filter, e.g. a double-bellows filter, with at least two radially nested filter bellows. Between them, a flow space for the fluid to be filtered is formed, wherein the flow space communicates with an end face of the filter element. Each one of the at least two radially nested filter bellows is configured as a star-shaped filter with filter folds arranged in a star shape and extending in the radial direction and having axially extending front edges. The radially inwardly positioned front edges of the folds of the outer filter bellows as well as the radially outwardly positioned front edges of the folds of the inwardly positioned filter bellows delimit the flow space, respectively, that serves for outflow of the filtered fluid as well as for intake of the unfiltered fluid.

Moreover, on at least one of the end faces of the filter element a sealing ring is arranged which provides a sealing action between the filter bellows, preferably embodied as a multi-bellows filter, and the filter housing. The sealing ring serves in particular for flow-tight separation of the unfiltered gas side from the filtered gas side of the filter element and prevents leakage flows that would impair the efficiency of the filter device proposed according to the invention. The sealing ring is expediently clamped axially between the filter element and the inner side of the housing and is loaded in the axial direction. Basically, a radial force loading of the sealing ring or a combination of axial and radial loading can be provided.

According to a first embodiment of the sealing ring, it can be arranged, for example, on a terminal disk that is manufactured of synthetic material and can be embodied, for example, as a sealing ring with a double lip. The sealing ring can be comprised of TPE, i.e., thermoplastic elastomer, which, for example, represents a sealing material that can be processed on injection molding machines for synthetic materials. Manufacture is also possible by a two-component injection molding method in which in general a hard component and then a soft component are injection-molded. The sealing ring can be adhesively connected, fused or snapped in. Manufacture can also be achieved by other processing methods for synthetic materials aside from the two-component method. The manufacture of the sealing ring with a double lip is not mandatory; of course, other sealing profiles deviating from such a double lip configuration can be produced also. The double lip is positioned on an annularly extending projection on the topside of a terminal disk. Between the individual lips of the TPE seal embodied as a double lip a spacing is provided that imparts to the TPE seal embodied as a double lip the required elasticity. Upon axial force loading of the sealing element embodied as a TPE double lip, compression of the two individual lips and compression of the material into the free space that is provided between the two individual lips of the sealing ring embodied as the double lip occur. The axial force loading of the TPE seal embodied as a double lip is realized after mounting of the filter element into the filter housing; this can be realized, for example, by means of a lateral insert when forcing the filter element against a contact flange in the interior of the filter housing of the filter device proposed according to the invention.

In a further embodiment of the seal between the filter housing of the filter element, the sealing ring can be configured as a two-component injection molded part and can form an annularly extending recess that is delimited by a soft synthetic material, wherein the soft elastic material is surrounded by a stiffer harder synthetic material. Into the recess of the circumferentially extending sealing ring which recess is delimited by the soft synthetic material, a circumferentially extending projection projects when mounting the sealing ring on the filter housing. The final sealing action between the circumferentially embodied projection on the filter housing and this embodiment of the sealing ring is realized upon joining the filter element, a cyclone preseparator arranged upstream, by means of clip-like closure elements. By means of these clip-like closure elements that are embodied on the circumference of the filter housing, the sealing force is generated that acts in axial direction and that forces the circumferential projection on the filter housing in the recess of the sealing ring which recess is formed by the softer synthetic component and, in turn, is enclosed on the sealing ring by the harder, stiffer synthetic material.

In an advantageous manner, the sealing ring according to the afore described two embodiments is located on a radially outwardly positioned side of the filter element of the filter device proposed according to the present invention, in particular in a transition area between axial end face and radially outwardly positioned wall surface of the filter element. In this way it is enabled that at least a partial flow of the fluid to be filtered can be supplied through the radially outwardly positioned wall surface of the filter element and for filtration can be guided through the filter element until it reaches the flow space between the two filter bellows.

Intake of the filter element that is embodied as a multi-bellows filter, in particular a double-bellows filter, as well as outflow of the purified, filtered fluid can be realized in different ways. On the one hand, there is the possibility of guiding flow through the wall of each of the two filter bellows exclusively in the radial direction and to remove the filtered fluid exclusively axially through the flow space, that is at the same time the clean chamber. On the other hand, it is possible that at least one of the filter bellows, in addition to the radial flow, is supplied with flow also in the axial direction and also outflow of at least one of the two filter bellows, in addition to guiding the flow through the flow space in the axial direction, is realized by means of flow passages within one of the bellows.

It has been found to be especially advantageous that the outwardly positioned first filter bellows, for example, is flown through in the axial direction and the axial outflow is realized by flow passages of the second filter bellows, for example, the radially inwardly positioned filter bellows.

In order to realize the intake flow or outflow cross-sections in the desired way, the cover elements that are manufactured, for example, of PUR material, in particular cover disks or cover rings, are arranged on corresponding axial end faces of the two filter bellows that are embodied with glued front edges. For example, the axial end face of the radially inwardly positioned filter bellows can be covered at the intake side of the filter element by a cover ring so that at this location an axial intake is prevented. The axial end face in the intake area of the radially outwardly positioned filter bellows however can be open in order to enable at this location, in addition to radial intake, also axial intake.

A cover disk is located in an advantageous way at the inner folded bellows at the outflow side. It closes off the inwardly positioned intake space within the folded bellows in the axial direction in order to prevent leakage flow immediately between the unfiltered side and the filtered side. The axial end face of the radially inwardly positioned filter bellows can be without a cover so that in this way an axial intake is possible in principle. This is so in case the folds are adhesively connected at one side.

At the same time, the axial end face in the outflow area of the radially outwardly positioned filter bellows is covered by a cover ring in order to prevent at this location axial outflow.

Moreover, it is expedient to glue together the folds at one side. Advantageously, this is done for each filter bellows such that only on one axial end face the front edges of the filter folds are tacked together while the front edges of the filter folds at the oppositely positioned end face are covered by a cover ring. Relative to the two filter bellows, tacking of the front edges of the filter folds and covering are done alternating so that, for example, on the radially outwardly positioned filter bellows the front edges are adhesively connected and at the opposite axial end face are covered by a cover ring and on the radially inwardly positioned filter bellows the axial intake side is covered by a cover disk. The front edges at the oppositely positioned axial outflow side are tacked together. By tacking the end faces flow spaces or passages that extend in the axial direction result wherein in connection with the cover elements it is ensured that the supplied fluid must pass the filter wall in the radial direction.

Even though, in relation to the sealing ring according to the above explained embodiment, it can be produced, for example, as a double lip of TPE, for example, by means of a 2C method, it is also possible to provide a circumferential seal not on the filter element to be inserted into the filter housing which filter element is preferably a multi-bellows filter, for example, a double-bellows filter, but as a circumferentially extending sealing ring in the interior of the filter housing. For this purpose, for example, the sealing element that is embodied as a double lip provided on the sealing side of the filter element can be moved to a side wall of the intake side of the filter housing. Also, it is possible to injection-mold the two-component injection-molded synthetic seal not on the filter housing but, for example, on the end face of the cyclone preseparator that is facing the filter housing.

The filter element, embodied preferably as a double-bellows filter, that is provided according to one embodiment, for example, on the topside with a circumferentially extending TPE seal in the form of a double lip, comprises filter bellows that are identical with the same course across the axial length or with different courses. Possible are a cylindrical shape as well as a conical shape with respect to the outwardly positioned as well as the inwardly positioned filter bellows. In an advantageous embodiment, the radially outwardly positioned filter bellows is cylindrical wherein its outer diameter and its inner diameter do not change across the axial length. Instead of a cylindrical embodiment, in an advantageous further embodiment regarding the constructive requirements of the filter housing a conical shape can be provided on the outer diameter so that, when mounting the filter element in the filter housing, as a result of the continuously decreasing outer diameter an additional space is formed in the interior of the filter housing that affects the outflow of the filtered fluid in an advantageous way, minimizes the flow velocity and thus the resulting noise.

The radially inwardly positioned filter bellows can have a cone shape wherein the cone shape tapers expediently from the intake side to the outflow side. In this way, a flow space is obtained between the filter bellows in the form of an annular cone that widens toward the outflow side and opens at an outlet opening. This is advantageous with respect to fluidic considerations relative to the outflow of the filtered fluid. Across the axial length the flow space thus has a changing cross-section wherein the rate of change in the axial direction is substantially constant. However, basically also rate of change that varies across the axial length is possible; also the flow space can have an unchanging cross-section which is the case when the inner side of the outer filter bellows and the outer side of the inner filter bellows extend concentrically to one another, i.e., there is no conical shape provided thereat.

When, for example, the outwardly positioned one of the two filter bellows is provided with a constant inner diameter, while at the outer wall surface of the radially inwardly positioned filter bellows a conical shape is provided, a conically extending annular space is formed. This annular space opens at the outflow side in an outlet opening. A support frame can be inserted into this annular space which frame frames the flow space between the filter bellows. In particular for large volume filter devices whose filter elements have a corresponding higher weight, this support frame that is preferably embodied as an injection-molded plastic part serves for increasing the stability. This support frame comprises ribs that extent in the axial as well as the radial direction by means of which in particular large volume filter bellows can be kept separate from one another so that the conically extending flow space formed between them retains a constant configuration with regard to its geometry. The support frame provides in this connection the required mechanical stability by a supporting action. The support frame is preferably of a monolithic configuration.

According to a further alternative embodiment of the present invention the filter device comprises a filter element within a filter housing which filter element is comprised of a continuous filter web with a plurality of parallel filter layers that are connected to one another by curved connecting sections of the filter web. Between neighboring filter layers spacers are provided. The intermediate spaces between neighboring filter layers form flow spaces for the fluid. The filter layers are planar or flat so that accordingly also the intermediately positioned flow spaces are delimited by parallel planes. By means of the curved connecting sections of the filter web that delimit alternatingly neighboring flow spaces at the opposite end faces of the filter element, it is ensured that every other flow space at the intake side is open or closed. The fluid to be filtered is introduced axially into the open flow spaces and must pass in the flow space radially the delimiting filter wall because the opposite axial end face of this flow space is closed off at the outflow side by the curved connecting section. The radial passage into the neighboring flow space enables axial outflow from the filter element.

The filter element of the filter device proposed according to the invention is advantageously inserted, independent of its constructive configuration, radially into the filter housing through a housing opening that is to be closed off by a lid. The filter element is substantially flown through in axial direction by the fluid to be filtered. Moreover, generally the filter element, i.e., the main filter element, has a prefilter arranged upstream thereof which prefilter is embodied as a cyclone preseparator and expediently is also flown through in the axial direction. Moreover, according to a further advantageous embodiment the filter elements can have downstream thereof a secondary or fine filter element that is advantageously also flown through in the axial direction.

For easier manipulation of the main filter element embodied preferably as a double-bellows filter it can be provided with a grip depression formed for example on the bottom side of the circumferentially extending sealing ring. The grip can be embodied in an advantageous way such that a one-hand mounting or demounting of the main filter element, i.e., of the filter element that is embodied as a double-bellows filter, can be realized. This is advantageous, for example, when exchanging a filter element of an air filter on an agricultural machine, for example, a harvester or a tractor, or a construction machine in which generally the operator will grab hold with the other hand.

Moreover, there is the possibility after mounting of the main filter element, embodied especially as a double-bellows filter, in the filter housing to push a lateral insert in the radial direction into the filter housing. Tongues provided laterally on the lateral insert move along ramps that extend on the inner side of the filter housing and effect upon complete insertion of the lateral insert on the ramp-shaped guides in the filter housing the generation of the sealing force with which, for example, the seal embodied as a double lip is forced against the filter housing. This is haptically recognized by the operator, for example, by means of increased pushing resistance or a noticeable locking of the lateral tongues of the lateral insert in a locking position on the ramp-shaped surfaces that are provided on the inner side of the filter housing, for example, are integrally injection-molded thereon.

A further advantageous detail of the proposed solution according to the invention is to be seen in that in addition to the grip depressions at the upper area of the main filter element preferably embodied as a double-bellows filter, alignment or centering cams are provided at the lower cover ring at an angular division of 90 degrees or 120 degrees. In this way, it is ensured that the filter element in particular for a one-hand manipulation is always mounted and aligned in the correct position, i.e., parallel to the longitudinal axis of the filter housing, so that upon axial force loading for producing the sealing action the filter element, embodied preferably as a double-bellows filter, is always centered with regard to the axis of the filter housing. In an advantageous way, one of the alignment or centering cams can be divided, for example, and can interact with a rib that is provided by injection-molding inside the housing. By this embodiment of a divided cam at the circumference of the main filter element a positionally correct insertion into the receptacle of the filter housing is ensured.

In the mounted state, there remains always a sufficient spacing between the inner wall of the filter housing and the outer wall of the radially outwardly positioned filter bellows so that the intake at the radially outwardly positioned filter bellows in axial direction remains constant because the spacing between the outer side of the radially outwardly positioned filter bellows and the inner side of the filter bellows is constant and stability with regard to mechanical loading is provided. The cams that are formed on a cover of the main filter element and extend in the radial direction dampen the main filter element in the state mounted in the filter housing so that it does not vibrate during operation.

In the filter element proposed according to the invention, in particular in the case of a filter element embodied as a double-bellows filter, on the radially inwardly positioned inner bellows a terminal disk of PUR and, with respect to the outwardly positioned bellows and the inwardly positioned bellows, a PUR bottom can be manufactured and both bellows forming the filter element can be foamed in. This provides a very inexpensive manufacturing variant of the filter element according to the invention, in particular embodied as a double-bellows filter. Its interior is closed off at the intake side by the PUR terminal disk so that the fluid to be filtered flows in through the also conically embodied annular space between the two nested filter bellows and subsequently flows out radially outwardly or radially into the interior at the clean side. In addition to manufacture from PUR the terminal disk can also be produced by other manufacturing methods. For example, other potting materials can be used or even glued-on or fused-on terminal disks of synthetic material or metallic terminal disks that are glued on can be used. When in particular the radially outwardly positioned filter bellows is conical relative to its outer diameter, between the outer diameter of the radially outwardly positioned filter bellows and the inner side of the filter housing a conically widening annular space results by means of which the filtered fluid flows into the clean chamber wherein as a result of the widening flow cross-section the flow speed decreases and possibly caused noise development can be reduced; likewise a reduction of the flow resistance is possible.

BRIEF DESCRIPTION OF THE DRAWINGS

Further advantages and expedient embodiments can be taken from the claims, the Figure description, and the drawings.

It is shown in.

In the Figures the same components are provided with same reference numerals.

DETAILED DESCRIPTION

Figure 1:
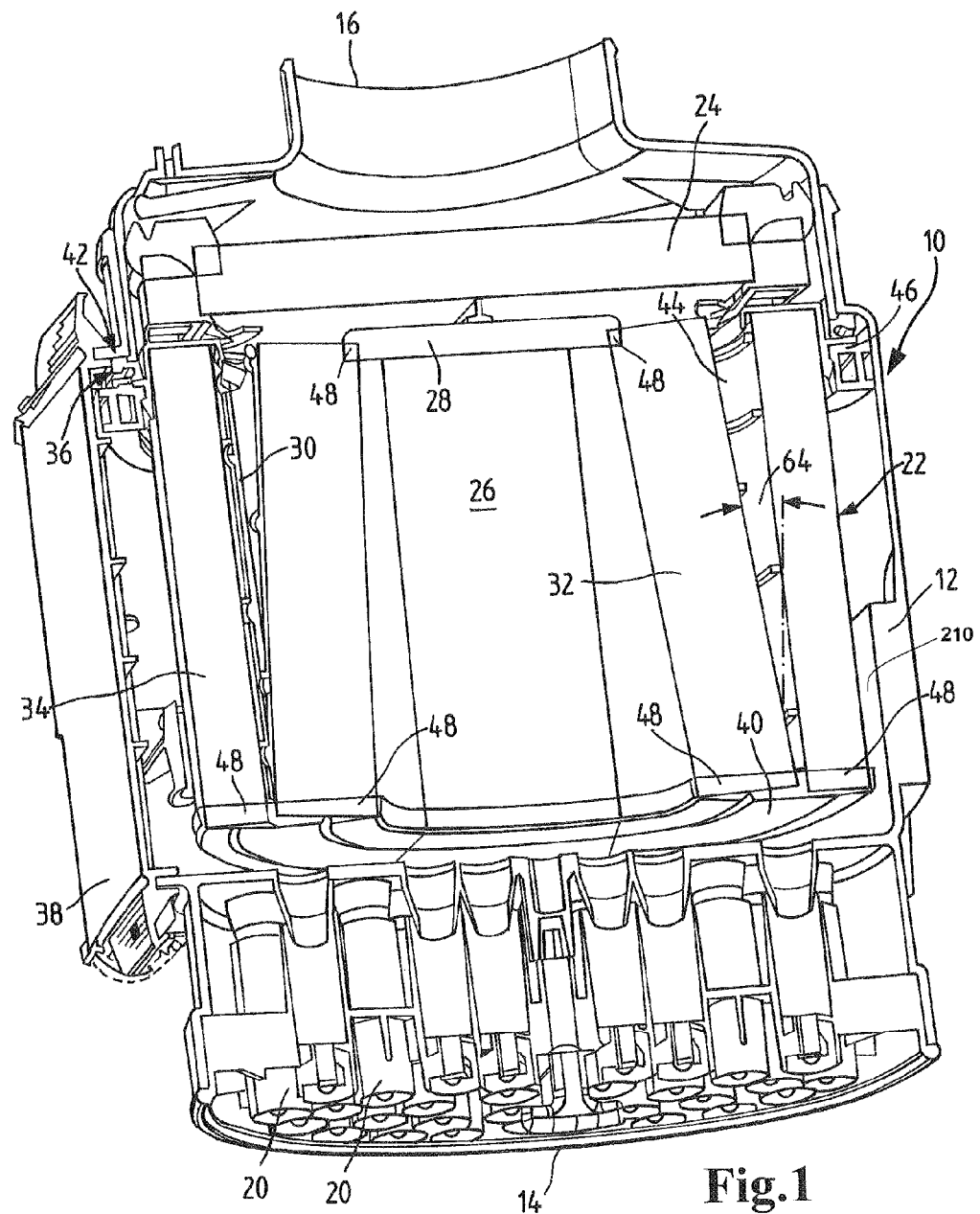
FIG. 1 a partially sectioned illustration of a filter device that is employed in particular as an air filter for internal combustion engines and comprises axially sequentially behind one another a cyclone preseparator, a main filter element and a downstream fine filter element, wherein the main filter element is a double-bellows filter with two radially nested filter bellows.

The filter device 10 illustrated in FIG. 1 is an air filter for an internal combustion engine that is used in particular in off-highway applications such as in agricultural machines like tractors or harvesters or in construction machines and the like. The filter device illustrated in FIG. 1 can also be used in stationarily employed internal combustion engines, for example, for generating power, as well as in large volume commercial vehicles.

The filter device 10 illustrated in FIG. 1 comprises a filter housing 12 in which a main filter element 22, a cyclone preseparator 20 embodied as a prefilter, as well as a fine filter 24 arranged downstream of the main filter element are received. FIG. 1 shows also that an intake side of the filter device 10 is referenced with reference numeral 14 while the outflow side is identified by reference numeral 16. In the area of the cyclone preseparator 20 an outlet opening 18 is provided by means of which coarse contaminants can be removed before they reach the main filter element 22.

The main filter element 22 that is downstream of the cyclone preseparator 20 in the flow direction of the fluid to be filtered comprises a first inwardly positioned filter bellows 32 and a second outwardly positioned filter bellows 34 that radially surrounds the first one. The radially inwardly positioned first inner filter bellows 32 surrounds an interior 26 that, viewed in axial direction, is closed off by cover disk 28. The medium to be filtered that has passed the cyclone preseparator 20 therefore flows through the first radially inwardly positioned filter bellows 32 in radial direction and enters a flow space 44 in which a support frame 30 is received. The support frame 30 supports the flow space 44 with regard to its geometric shape and supports the second radially outwardly positioned filter bellows 34. At the intake side, the first radially inwardly positioned filter bellows 32 as well as the second radially outwardly positioned filter bellows 34 are closed off by a cover ring 40. In this way, it is ensured that the fluid to be filtered entering the interior 26 flows through the first inwardly positioned filter bellows 32 outwardly in the radial direction into the flow space 44.

The illustration according to FIG. 1 also shows that the second radially outwardly positioned filter bellows 34 is cylindrical, i.e., in axial direction, it has a constant inner as well as outer diameter, viewed in the axial direction. In contrast to this, the first radially inwardly positioned filter bellows 32 has a conical shape 64 which enables the conical flow space 44. The air that has passed the cyclone preseparator 20 flows moreover in the space 210 from the outer wall surface of the second radially outwardly positioned filter element 34 also to the flow space 44 and from there through an outlet opening, illustrated in the following Figures, to the fine filter element 24.

Figures 15, 16:
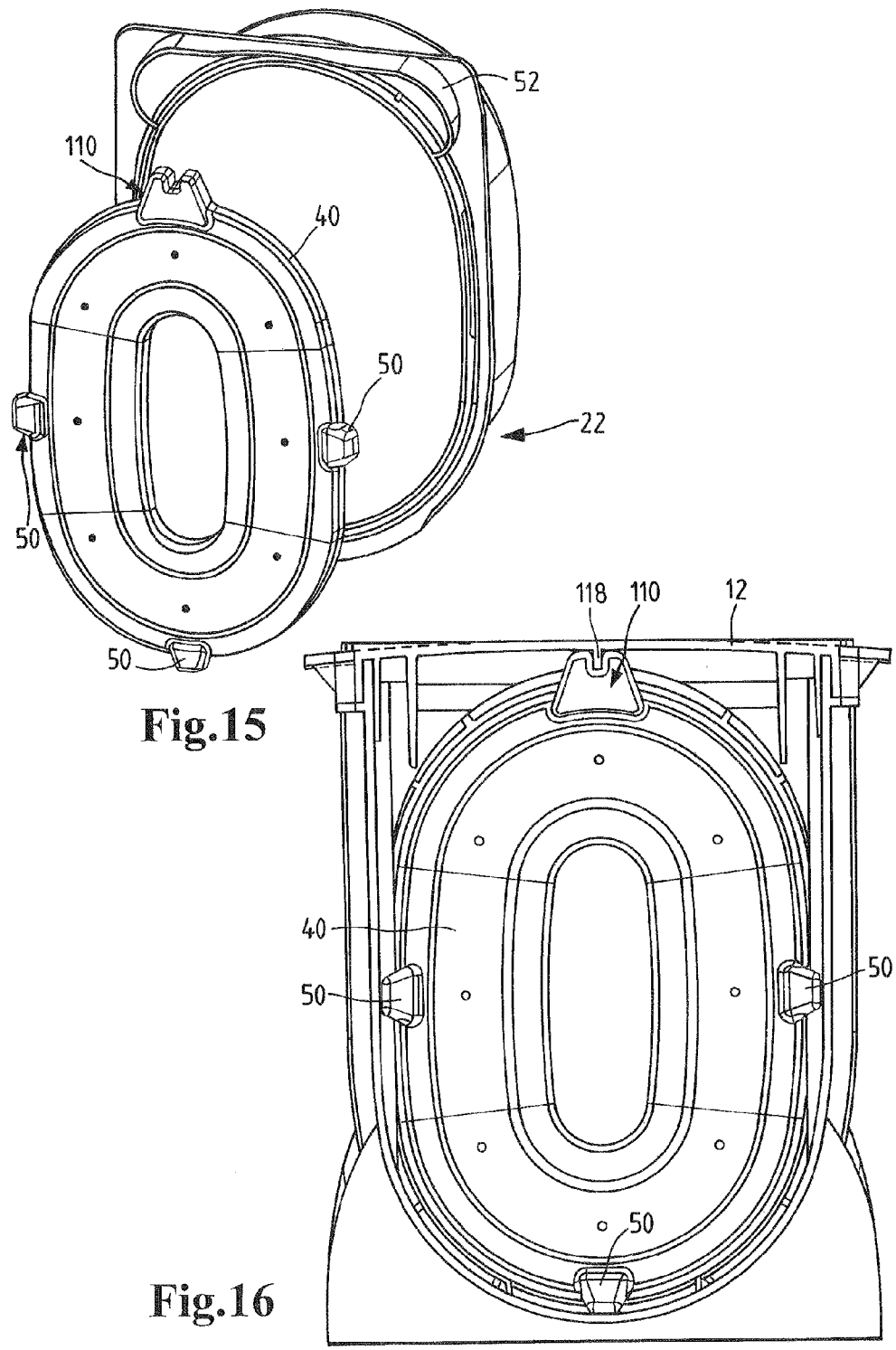
FIG. 15 a perspective view of a cover of the main filter element with three centering cams as well as an alignment or centering cam which is divided and embodied in a 12 o'clock position.
FIG. 16 a plan view onto the main filter element illustrated in FIG. 15 in a perspective illustration with a cover.

The main filter element 22 comprises the cover ring 40 on which individual alignment and securing cams 50 are provided with which it is supported on the inner side of the filter housings 12 of the filter device 10 (compare FIGS. 15 and 16). The unfiltered gas side is sealed relative to the filtered gas side of the filter device 10 by a seal in the form of a sealing ring to be described in more detail in the following. The sealing ring 36 can be, for example, embodied as a double lip that is manufactured of TPE or by a two component injection molding process (2C method) for synthetic materials.

As a result of the positioning of the main filter element 22, preferably embodied as a double-bellows filter element, by means of the cams 50 that are provided on the outer circumference of the cover ring 40 at 120 degree division or 90 degree division, the exact orientation of the main filter element 22 in the mounted state in the interior of the filter housing 12 of the filter device 10 according to the invention in accordance with the illustration of FIG. 1 is ensured. One of the cams 50 serving as centering or alignment cams for the main filter element 22 can be of a divided configuration as illustrated, for example, in FIGS. 13 and 14. The divided of the alignment or centering cams 50 interacts with a rib formed in the inner side of the filter housing 12. By means of the cams 50 the main filter element 22 is secured in the mounted state in a vibration-free way and by means of the divided of the cams 50 the positionally correct mounting of the main filter element 22 in the filter housing 12 is ensured.

The illustration according to FIG. 1 shows that the sealing ring 36, embodied here as a TPE seal with double lip, is resting against a contact flange 42 of the filter housing 12.

The main filter element 22 illustrated in the mounted state in FIG. 1 is secured by a lateral insert 38 laterally insertable into the filter housing 12. This means that after mounting of the main filter element 22 through a lateral opening 66 of the filter housing 12, the insert 38 moves into the filter housing 12. By mounting the insert element 38 on insertion rails 70 extending in the filter housing 12, a sealing force acting in the axial direction is generated, i.e., the main filter element 22 inserted prior to this into the filter housing 12 is pre-tensioned in the axial direction and forced against the filter housing 12. In this way, the seal 36, embodied as a double lip and provided at the upper end face of the main filter element 22, is forced against its counterpart, i.e., the contact flange 42 of the filter housing 12 and the sealing force is generated. By means of the sealing force acting in the axial direction the unfiltered gas side is separated from the filtered gas side of the filter device 10 illustrated in FIG. 1, showing one half in section view.

Figure 2:
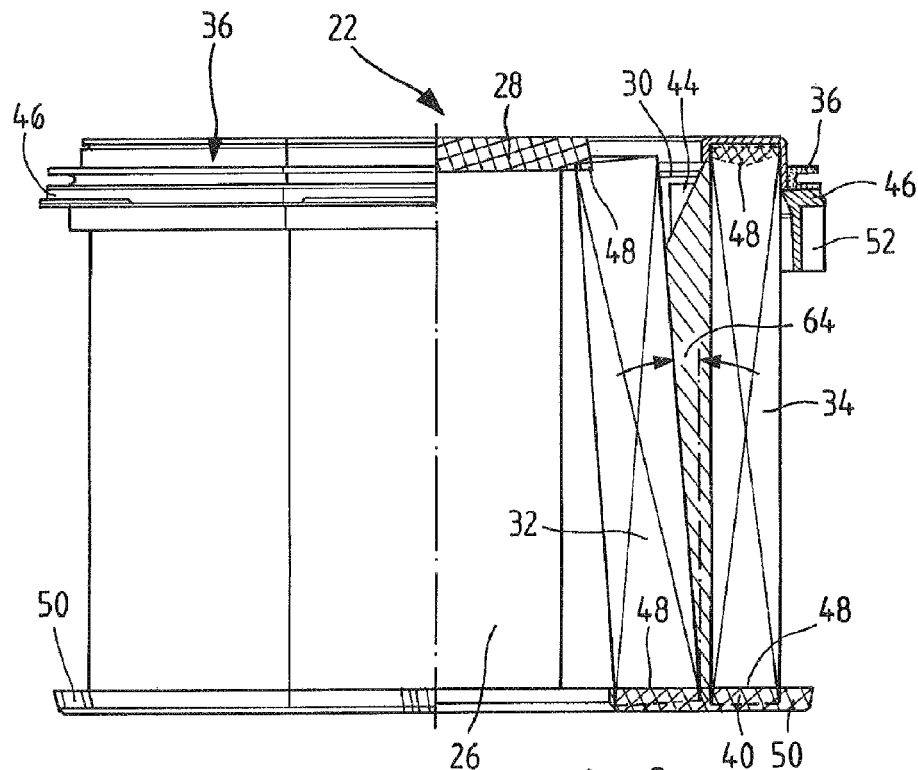
FIG. 2 the filter element, one half in a section view.

The illustration according to FIG. 2 shows the main filter element of the filter device according to FIG. 1 with one half in section view.

The main filter element 22, embodied as a double-bellows filter, comprises the first radially inwardly positioned filter bellows 32 and the second outwardly positioned filter bellows 34 surrounding it radially. Both filter bellows 32, 34 are flown through substantially in the radial direction from the interior to the exterior or from the exterior to the interior. In the axial direction the intake at the end faces is prevented at the intake side 14 by the cover ring 40. As can be seen from the half-section illustration according to FIG. 2, the cover ring 40 has laterally projecting securing or centering cams 50. They can be produced very simply when producing the cover ring 40. By means of these alignment and securing cams 40 that are distributed about the circumference of the cover ring 40 at 90 degree or 120 degree division or in divisions deviating therefrom, the main filter element 22 is aligned in the filter housing 12 of the filter device 10 proposed according to the present invention. The cover ring 40 corresponds to the bottom 92 of the main filter element 22.

The illustration according to FIG. 2 also shows that on the topside of the main filter element 22 a circumferentially extending annular projection 46 is located on which a seal 36 is received which, in this embodiment is embodied as a double lip. The lower individual lip of the seal 36 is supported on the annularly extending projection 46 at the topside of the main filter element 22.

The first radially inwardly positioned filter bellows 32 delimits the interior 26 that is closed off at the outflow side by the foamed-in or injection-molded cover disk 28. In this way, the axially incoming fluid is caused to perform a radial flow through the first radially inwardly positioned filter bellows 32 in the radial direction. After passage of the first radially inwardly positioned filter bellows 32 the fluid flows into the flow space 44 whose wedge-shaped contour is produced by the support frame 30 that is arranged between the inner side of the second outwardly positioned filter bellows 34 and the outer side of the conically embodied first radially inwardly positioned filter bellows 32 and determines the contour of the flow space 44. The position 48 indicates the foaming-in locations where the axial end faces of the first radially inwardly positioned filter bellows 32 as well as of the second radially outwardly positioned filter bellows 34 are connected to the cover disk 28 or the cover ring 40. The embodiment of foamed-in portions 48, for example, of synthetic material such as PUR or the like enables a defined default flow direction of the main filter element 22, here embodied as a double filter bellows, as well as a very easy and inexpensive manufacturing possibility thereof.

Figure 3:
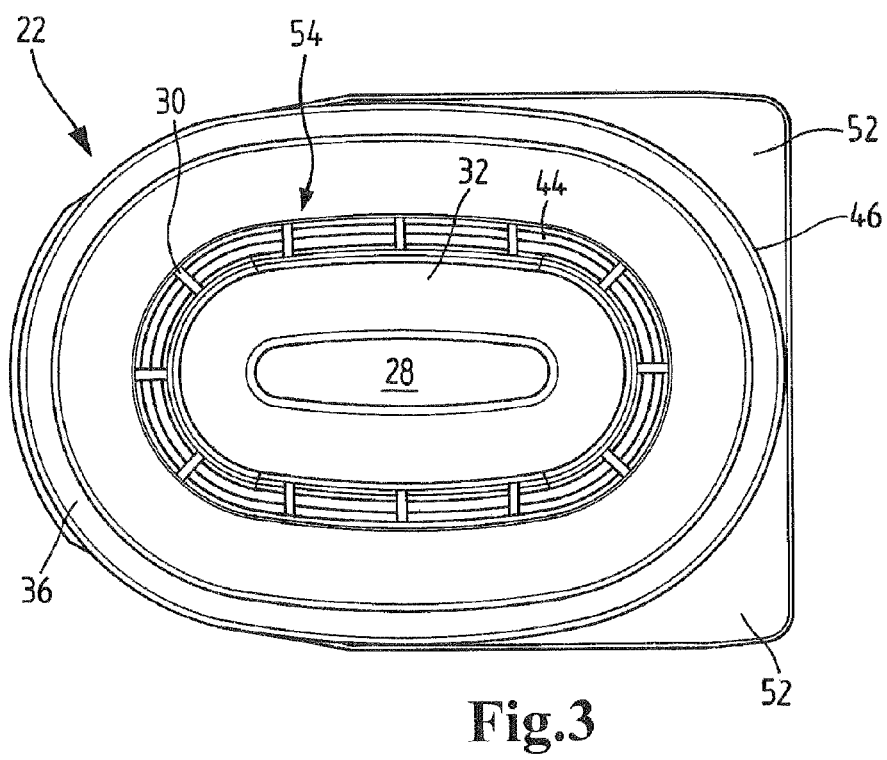
FIG. 3 a plan view onto the filter element with laterally provided injection-molded grip depression.

FIG. 3 shows a plan view of the main filter element illustrated in FIG. 2 with one half in section view.

The illustration according to FIG. 3 shows that, as already mentioned in connection with FIG. 2, at the bottom side of the annularly extending projection 46 a grip depression 52 or a grip member 52 is provided by injection-molding. This enables a one-hand handling of the main filter element 22 proposed according to the invention. When a machine operator is forced to exchange on short notice an air filter element of an internal combustion engine on a tractor, a harvester, or a construction machine or the like, this generally requires climbing up to the internal combustion machine, in particular, to the intake manifold. The machine operator is forced to grab hold with one hand and has only one hand free in order to exchange with one hand the main filter element 22 which is subject to wear in the filter device 10. This one-hand exchange is significantly simplified by the laterally provided injection-molded easily accessible grip depression 52 or laterally provided injection-molded grip member 52. When after exchange of a spent main filter element 22 the lateral insert 38 is again pushed in, simply by the insertion movement, axial pretension is generated which generates in the end the sealing action between the seal 36 embodied as a double lip and the filter housing 12 or the contact flange 42 provided thereat.

The illustration according to FIG. 3 also shows that the seal 36 extends uninterrupted on the annular projection 46 and that, at the outflow side of the filter element 22 illustrated in FIG. 3, an outlet opening 54 is provided by the support frame 30 that defines the flow space 44.

By means of the oval outlet opening 54 the filtered fluid flows out of the fine filter element 24 illustrated in FIG. 1.

Figure 4:
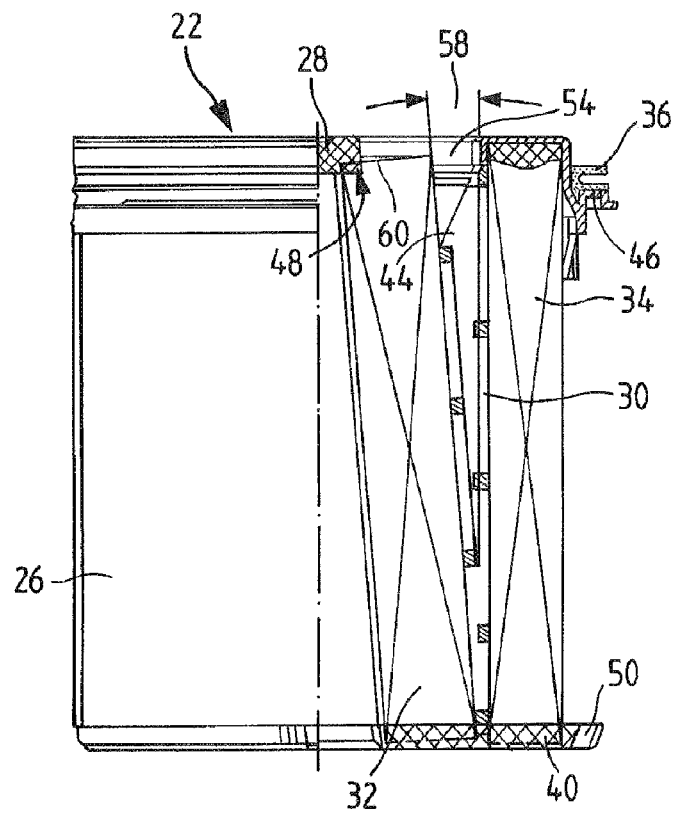
FIG. 4 an illustration of foaming-in locations of the filter bellows in cover grooves and cover disk.

FIG. 4 shows the support frame between the filter bellows of the main filter element embodied as a double filter bellows on an enlarged scale.

As can be seen in FIG. 4, the support frame 30 that defines the conical flow space 44 comprises a rib structure 56 extending perpendicularly to the plane of the illustration in the circumferential direction. In axial direction, viewed from the intake side 14, the conically shaped flow space 44 widens in the direction toward the outflow side 16. Reference numeral 54 indicates an outlet opening of the flow space 44. The first radially inwardly positioned filter bellows 32 as well as the radially outwardly positioned second filter bellows 34 are substantially flown through in the radial direction. As shown in the illustration of FIG. 4, the end faces of the two filter bellows 32, 34 are connected by foamed-in parts 48 either to the cover disk 28 or the cover ring 40 wherein on the outer circumference the alignment and holding cams 50 can be provided in any number by injection-molding. FIG. 4 shows also that in comparison to the cylindrically embodied second radially outwardly positioned filter bellows 34 the first radially inwardly positioned filter bellows 32 has a conical shape 64 in accordance with the conical shape of the support frame 30. The conical shape of the flow space 44 is indicated by reference numeral 58.

The interior 26 is delimited by the inner diameter of the first radially inwardly positioned filter bellows 32.

Figure 5:
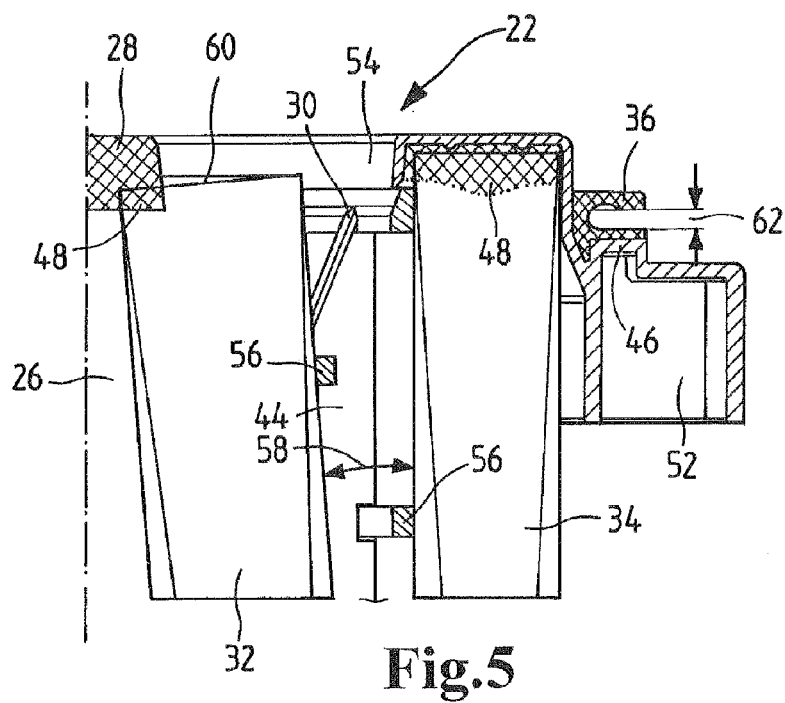
FIG. 5 an enlarged illustration of the area of the TPE seal embodied as a double lip and FIG. 6 an exploded view of the important parts of the filter element according to FIGS. 1 to 5.

FIG. 5 shows on an enlarged scale the upper area of the main filter element already shown respectively in FIGS. 2, 3 and 4 with one in half in section.

As shown in FIG. 5, above the annular projection 46 a seal 36 embodied as a double lip is provided. The two individual lips of the seal 36 embodied as a double lip are spaced apart in the relaxed state of the seal 36 by spacing 62. On the lower individual lip there is a pin-shaped projection that engages a circumferentially extending recess of the annularly embodied projection 46 which recess has a complementary shape with regard to the geometry of the pin-shaped projection. Below the annularly extending projection 46 the grip member 52 is provided with which the one-hand manipulation of the main filter element 22 is realized. In the illustration according to FIG. 5, which in comparison to the illustrations according to FIGS. 2, 3 and 4 is shown at an enlarged scale, the foamed-in parts 48 of the end faces of the filter bellows 32, 34 at the outflow side can be seen; moreover, the conical shape 58 of the flow space 44 can be seen where the support frame 30 is located. A circumferentially extending rib structure of the support frame 30 of the flow space 44 is identified by reference numeral 56. The fluid that flows through the first radially inwardly positioned filter bellows 32 from the interior to the exterior flows into the flow space 44 and from there exits through outlet opening 54. In contrast to this, the second radially outwardly positioned filter bellows 32 is flown through from the exterior to the interior by the fluid to be filtered and exits the conically embodied flow space 44 also at the outlet opening 54.

Figure 6:
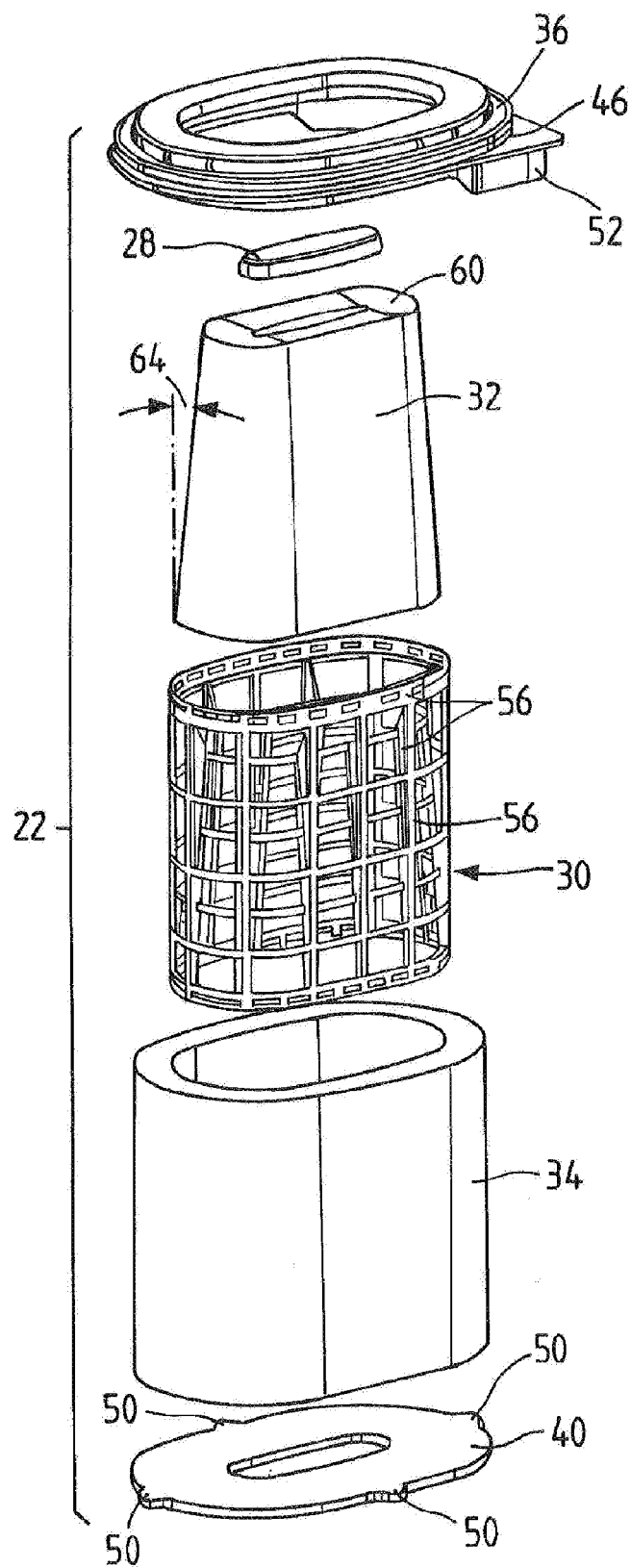

FIG. 6 shows an exploded view of the significant components of the first embodiment of the main filter element of the filter device proposed according to the invention.

The exploded illustration of FIG. 6 of the components shows that one or several grip depressions 52 are located laterally below the seal 36 that is embodied as a double lip. It is located on the annularly extending projection 46 that has already been mentioned several times. The reference numeral 28 identifies in the exploded illustration according to FIG. 6 the cover disk that closes off the interior 26. In FIG. 6 the reference numeral 60 indicates an adhesive connection at the front edges with which filter bellows folded in a star shape, for example, are provided at the outflow and intake sides.

The exploded view according to FIG. 6 also shows that the first radially inwardly positioned filter bellows 32 has a conical shape 64 that is matched to the conical shape of the support frame 30. The support frame 30 comprises grid-shaped structured ribs 56 extending in the axial direction and the circumferential direction.

In contrast to the contour of the first radially inwardly positioned filter bellows 32 and its outer wall surface provided with a conical shapes 64, the second radially outwardly positioned filter bellows 34 is cylindrical. Its outer diameter could also be provided with a conical shape in order to take into account, for example, tight installation spaces and in order to enable a uniform intake in the radial direction.

Finally, the illustration according to FIG. 6 also shows that the cover disk 40 at the outer circumference is provided with several alignment and securing cams 50. They have been explained already in connection with FIGS. 1 to 5.

Figure 7:
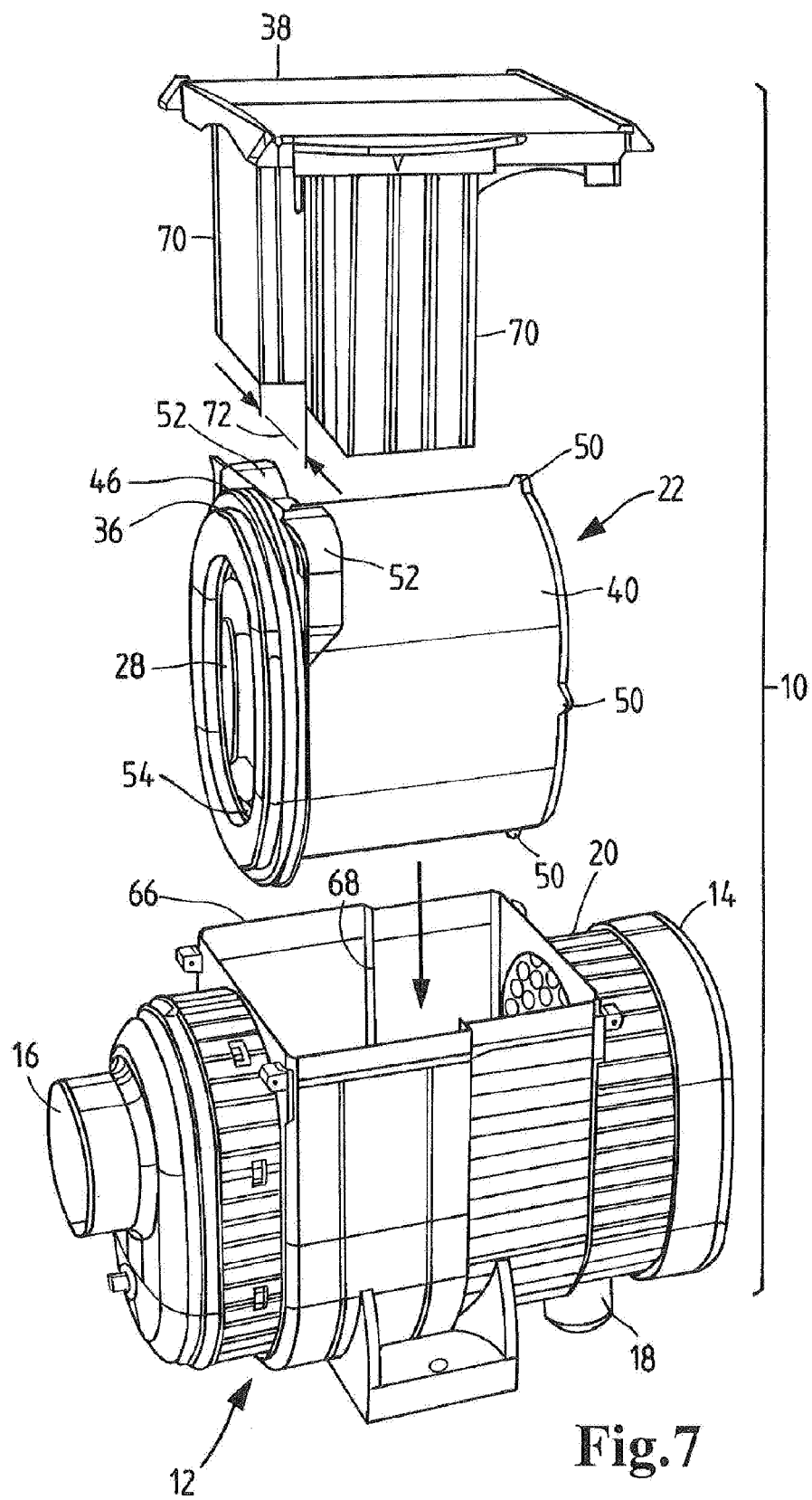
FIG. 7 an exploded illustration of insertion element, main filter element, and filter housing.

FIG. 7 shows an exploded illustration of the components insertion element, filter element, and filter housing of the filter device according to the present invention.

As can be seen in FIG. 7, the filter housing 12 has a lateral opening that is referenced by reference numeral 66. The opening 66 is provided laterally on the filter housing 12. The filter housing 12 is produced in particular as an injection-molded part of synthetic material. A guide projection 68 is provided at the opening 66 and extends substantially perpendicularly to the longitudinal axis of the lateral opening 66 and serves as a guide for the lateral insert identified by reference numeral 38. The lateral insert 38 comprises according to the illustration of FIG. 7 insertion rails 70 whose lower side, when inserting the lateral insert 38, is slidable in the opening 66 of the filter housing 12 on the guide projection 68.

First, upon mounting or demounting of the main filter element 22, the latter is gripped at the grip depressions or grip members 52 and is pulled out of the lateral opening 66. Subsequently, a new unspent main filter element 22 is inserted into the lateral opening 66. After it has been inserted into the lateral opening 66, the main filter element 22 is first centered and aligned within the filter housing 12 by means of the cams 50 provided on the cover ring 40 at a division of 90 or 120 degrees. For producing the sealing force acting in the axial direction of the main filter element 22, the lateral insert 38 is pushed into the lateral opening 66. On the lateral insert 38 insertion rails 70 are formed that provide a free space 70 relative to one another that upon insertion of the lateral insert 38 into the lateral opening 66 engage through the main filter element 22 that has been pre-installed. Upon insertion of the lateral insert 38 into the lateral opening 66 of the filter housing 12, the topsides of the insertion rails 70 that are provided with a gentle slope engage the pre-installed main filter element 22 and force it, when the lateral insert 38 has been completely inserted into the lateral opening 66, against the housing side of the filter housing 12 that receives the fine filter element 24. In this way, the seal 36 provided on the main filter element 22 is forced against the sealing surface that is formed on the corresponding side of the filter housing 12. Once the lateral insert 38 has been completely inserted with its insertion rails 70 into the lateral opening 66, the main filter element 22 is positioned in axial direction with its seal 36 against a corresponding sealing surface of the filter housing 12, for example, on a contact flange 42, and in this way the axial sealing force is produced in the axial direction.

Even though in the illustration according to FIG. 7 provided on the main filter element 22, the seal, i.e., the seal 36, embodied preferably as a double lip, can also be provided in kinematic reversal not on the main filter element 22 but on the corresponding sealing surface of a lateral surface of the lateral opening 66 of the filter housing 12.

The guiding action of the lateral insert 38 in the filter housing 12 is realized along the guide projections 68 that are provided on lateral surfaces that delimit the opening 66 in the filter housing 12.

Figure 8:
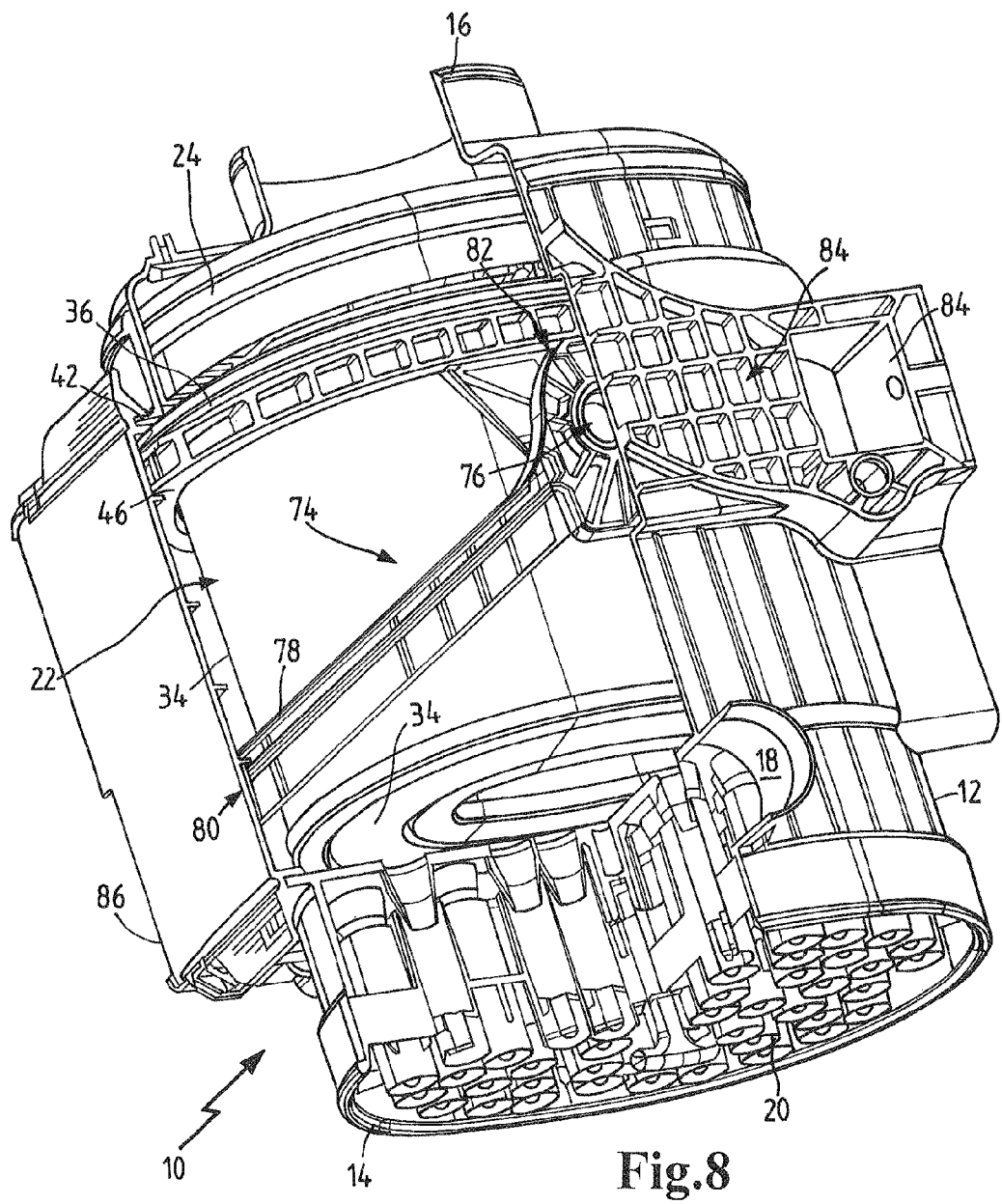
FIG. 8 a perspective representation of a locking mechanism for a filter element in the filter housing.

The illustration according to FIG. 8 shows an embodiment of the filter device according to the invention of a larger size.

In order to take up forces that occur upon moving the locking device 74 from its release position into its locking position 80, on the filter housing 12 in the area of the joints 76 a reinforcement structure 84 is provided by injection-molding. The mounting opening, i.e., the housing receptacle 66 in the filter housing 12, is closed off by a lid 86 that is only partially illustrated in FIG. 8.

In order to be complete, it should be mentioned that in the perspective illustration of FIG. 8 the filter device 10 at the intake side 14 has the cyclone preseparator 20 and at the outflow side 16 the fine filter element 24 (not shown in section here). The locking action 74 is actuated by means of a grip member 78.

Figure 9:
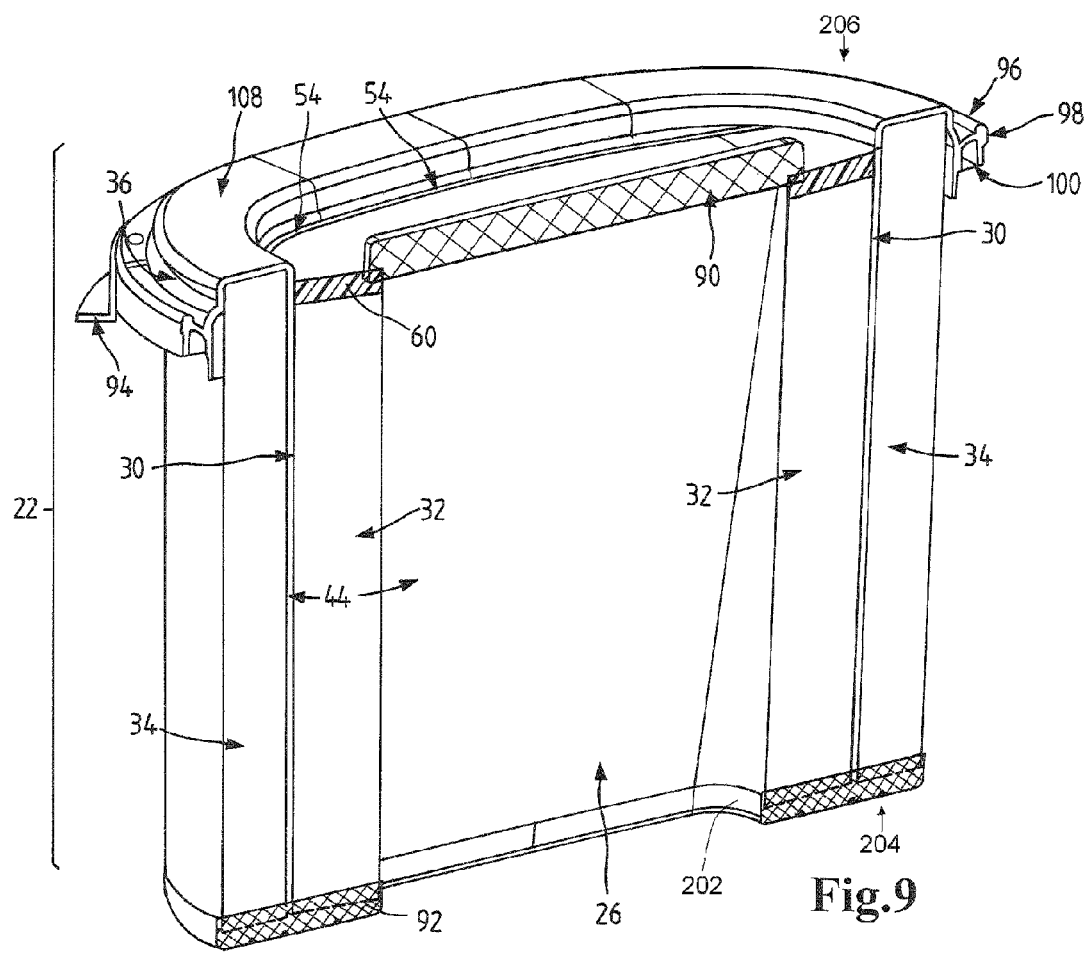
FIG. 9 a section in longitudinal direction of a further embodiment of the filter element with seal.

FIG. 9 shows a further second embodiment of the filter device according to the invention, in particular of the main filter element.

The longitudinal section illustrated in FIG. 9 shows that the seal 36 which produces the axial sealing action is formed at the topside of the main filter element 22 as a two-component injection molded plastic part. While the annularly embodied seal 36 on which cams 94 of a first synthetic material 96 are provided by injection-molding, is injection-molded from the aforementioned first synthetic material, a softer second synthetic material 98 with excellent elastic properties is injection-molded into the first plastic material 96 so as to delimit a recess 100. The softer second synthetic material 98 delimits a recess 100 that opens downwardly.

The longitudinal section illustrated in FIG. 9 of the main filter element 22 shows that the first radially inwardly positioned filter bellows 32 that surrounds the interior 26 is closed off by terminal disk 90 (PUR). The terminal disk 90 is preferably foamed to an axial end face of the first inwardly positioned filter bellows 32. The opening that is opposed to the terminal disk 90 at the intake side is delimited by a bottom 92 which releases an intake opening 202 into the interior 26 of the main filter element 22. Through this opening the fluid to be filtered flows into the interior 26. Because of the terminal disk 90 the fluid to be filtered is forced to flow in radial flow through the first radially inwardly positioned filter bellows 32.

The axial end faces that have preferably a front edge adhesive connection 60 are closed off at the main filter element intake side end face 204 by the bottom 92 while the axial end face of the second radially outwardly positioned filter bellows 34 is closed off at the main filter element outlet face 206 by an annular cover 108. As a result of this measure, a radial flow from the outer side to the inner side relative to the second radially outwardly positioned filter bellows 34 is imparted so that the fluid to be filtered passes, on the one hand, in the radial direction from the first inwardly positioned filter bellows 32 into the flow space 44 and, on the other hand, enters this flow space 44 at the inner side of the second radially outwardly positioned filter bellows 34. Its outlet opening is marked in the illustration according to FIG. 9 by reference numeral 54.

Figure 10:
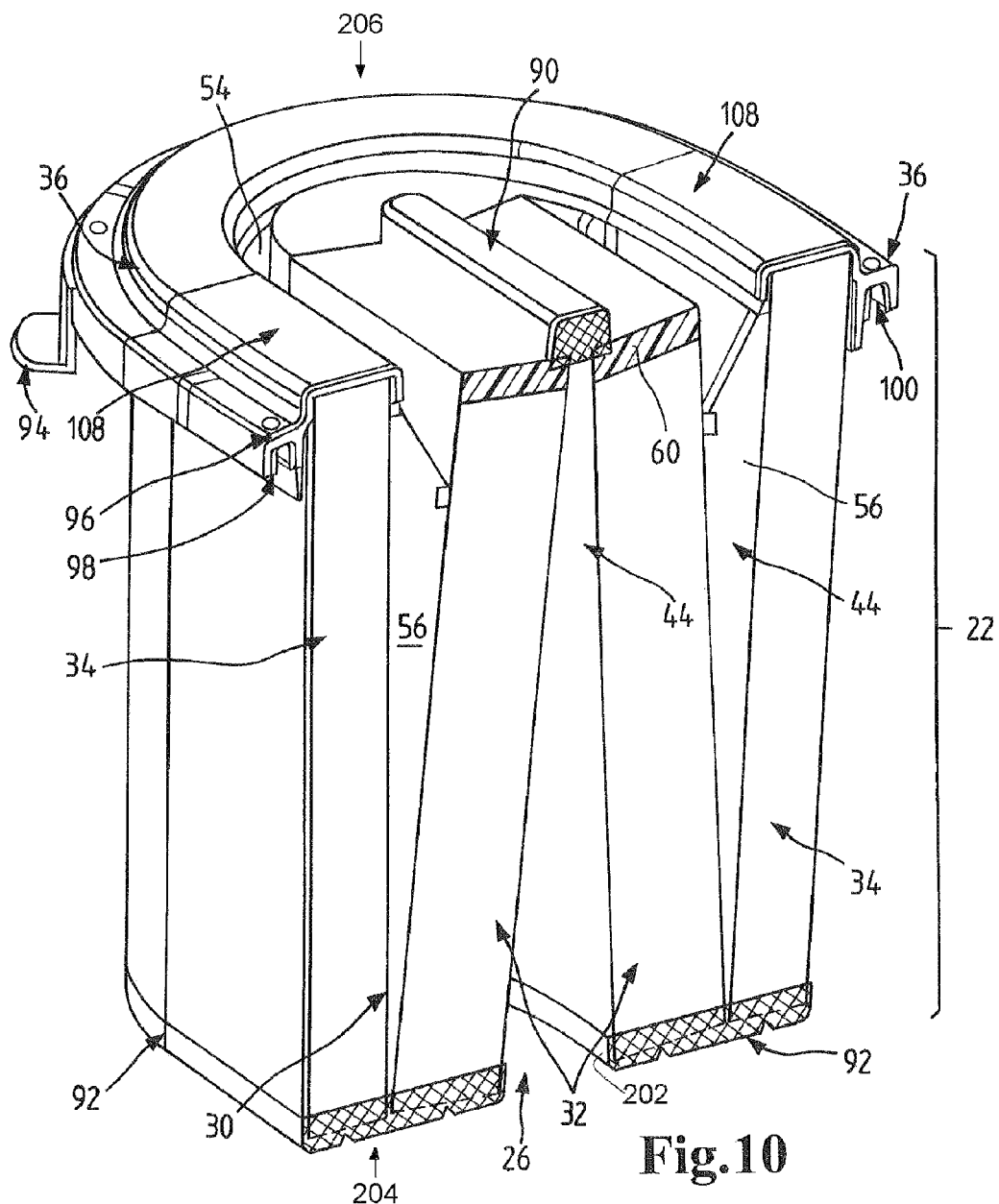
FIG. 10 a cross-section of the filter element according to FIG. 9.

The illustration according to FIG. 10 shows a cross-section of the main filter element shown in cross-section in FIG. 9 in accordance with the second embodiment.

FIG. 10 shows that the circumferentially extending seal 36, made from the first harder and stiffer synthetic material 96 has the recess 100 that is delimited by the second synthetic material 98 that has excellent elastic properties. The recess 100 interacts with a circumferentially extending nose 104 formed annularly on the filter housing 2, see illustration according to FIG. 11. FIG. 10 also shows that the interior 26 that is delimited by the inner side of the first radially inwardly positioned filter bellows 32 is closed off by the terminal disk 90 in the axial direction at the outflow side 16. The illustration according to FIG. 10 also shows that the outer diameter of the first radially inwardly positioned filter bellows has a conical shape 64 that is maintained by the support frame 30 interposed between the first radially inwardly positioned filter bellows 32 and the second radially outwardly positioned filter bellows 34. The support frame 30 which maintains the conical shape of the flow space 44 forms at the outflow end of the main filter element 22 the outlet opening 54. In contrast to the first radially inwardly positioned filter bellows 32 the second radially outwardly positioned filter bellows 34 is cylindrical but could also have a conical shape 106 at its outer diameter. This possibility of an embodiment of the outer contour of the second radially outwardly positioned filter bellows 34 is illustrated in the exploded view according to FIG. 12.

The illustration according to FIG. 10 also shows that the intake side 14 of the main filter element 22 according to the illustration of FIG. 10 is closed off by the bottom 92. On the intake side 14 in the area of the bottom 92 as well as on the outflow side 16 in the area of the cover disk 90 the axial end faces of the first radial inwardly positioned filter bellows 32 as well as of the second radially outwardly positioned filter bellows 34 of the main filter element 22 have the adhesive connection 60 at the front edges. Outwardly provided injection-molded cams 94 serve as a rotational securing device for the main filter element 22 in the filter housing 12.

Figure 11:
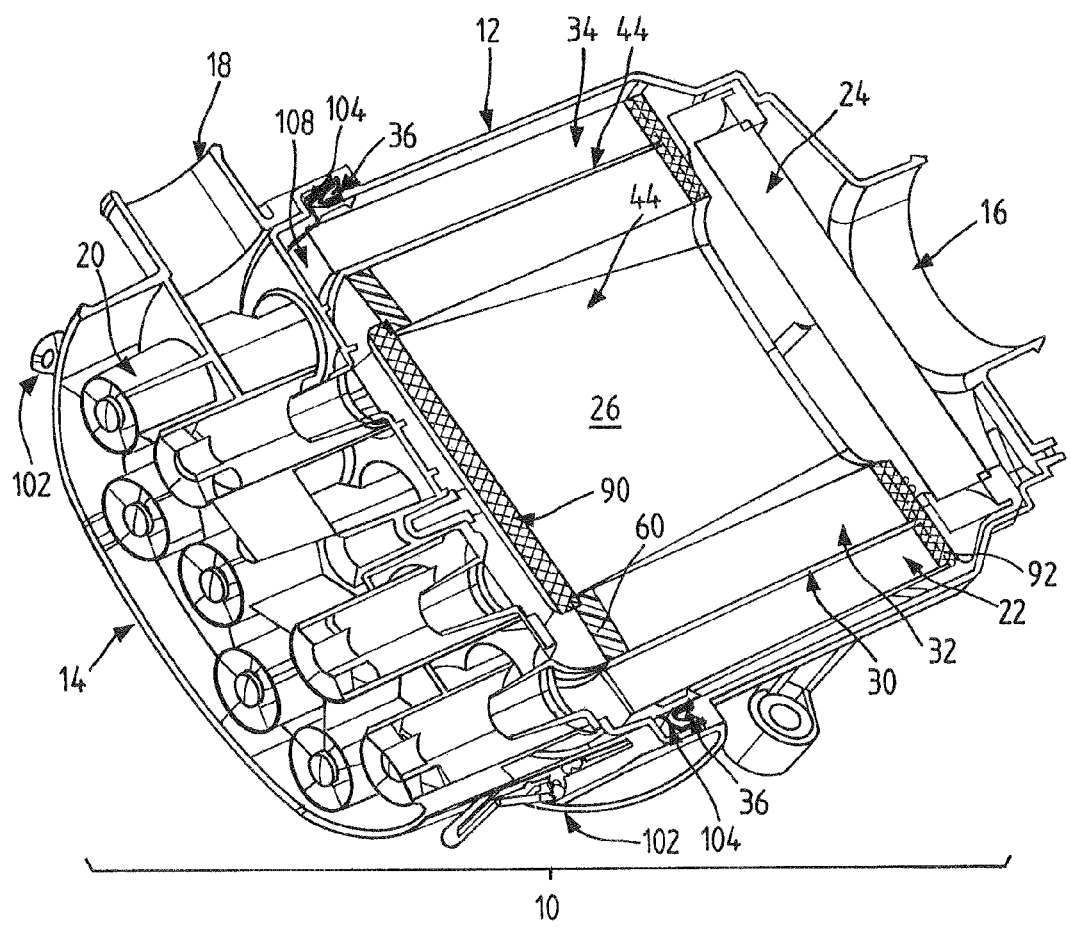
FIG. 11 a perspective view of the filter device in the second embodiment with inserted filter element.

The illustration according to FIG. 11 is the perspective illustration of a longitudinal section of the filter device 10 proposed according to the invention in accordance with the second embodiment.

FIG. 11 shows that the filter housing 12 of the filter device 10 at the intake side 14 has the cyclone preseparator 20, viewed in flow direction downstream thereof, the main filter element 22 and axially behind it the fine filter element 24. The outflow side of the filter housing 12 is referenced by reference numeral 16.

In contrast to the first embodiment of the filter device 10 proposed according to the invention, in this embodiment the sealing force directed substantially in the axial direction is not generated by the lateral insert 38, compare illustration according to FIG. 7, but the cyclone preseparator 20 is attached to the filter housing 12 by closure means 102. Upon joining the filter housing 12 and the cyclone preseparator 20, insertion of the nose 104 circumferentially extending on the filter housing 12 into the recess 100 is realized which recess is delimited by the second synthetic material 98 exhibiting elastic properties. The required axial force is generated by the closure means 102 so that, as shown in FIG. 11, in the joined state of cyclone preseparator 20 and filter housing 12 a sealing action of the unfiltered gas side relative to the filtered gas side is realized.

Since the second synthetic material 98 is enclosed by the first synthetic material 96 which is significantly harder and stiffer, the second synthetic material 98 that delimits the recess 100 cannot flow laterally so that upon insertion of the nose 104 circumferentially extending about the filter housing 12 into the recess 100 a reliable sealing action is ensured that also survives frequent opening and closing without damage because the second synthetic material 98 is encapsulated and even after several opening and closing actions does not flow.

In order to be complete, it should be noted that the main filter element 22, illustrated in FIG. 11 in the mounted state, in the section illustration according to FIG. 11 comprises the first radially inwardly positioned filter bellows 32 as well as the second radially outwardly positioned filter bellows 34. As already mentioned in connection with FIGS. 9 and 10, the second radially outwardly positioned filter bellows 34 is cylindrical while the filter bellows 32 surrounded by it and positioned inwardly can have a cone shape at its outer diameter and its inner diameter. The conical shape 64 of the outer diameter of the first radially inwardly positioned filter bellows 32 provides in interaction with the support frame 38 that is also provided with a conical shape the contour of the flow space 44 which continuously tapers in the direction of the outflow side 16 with regard to its cross-section.

The illustration according to FIG. 11 also shows that the illustrated cyclone preseparator 20 has the outlet opening 18 through which coarse particles of the fluid flow to be filtered can be directly separated so that they do not even reach the main filter element 22. Because of the terminal disk 90 and the cover 108 intake at the second radially outwardly positioned filter bellows 34 is realized from the radial side, i.e., in the radial direction in the direction determined by the inner side of the filter housing 12 and the outer wall surface of the second outwardly positioned filter bellows 34 because the axial end face of the second radially outwardly positioned filter bellows 34 is closed off by the cover 108. The first radially inwardly positioned filter bellows 32 has axial intake at the front edge adhesive connection 60.

The first radially inwardly positioned filter bellows 32 has intake at the axial end face having the front edge adhesive connection 60 and the filtered fluid flows in radial direction inwardly into the interior 26 and from there into the fine filter element 24 arranged downstream of the main filter element 22.

Figure 12:
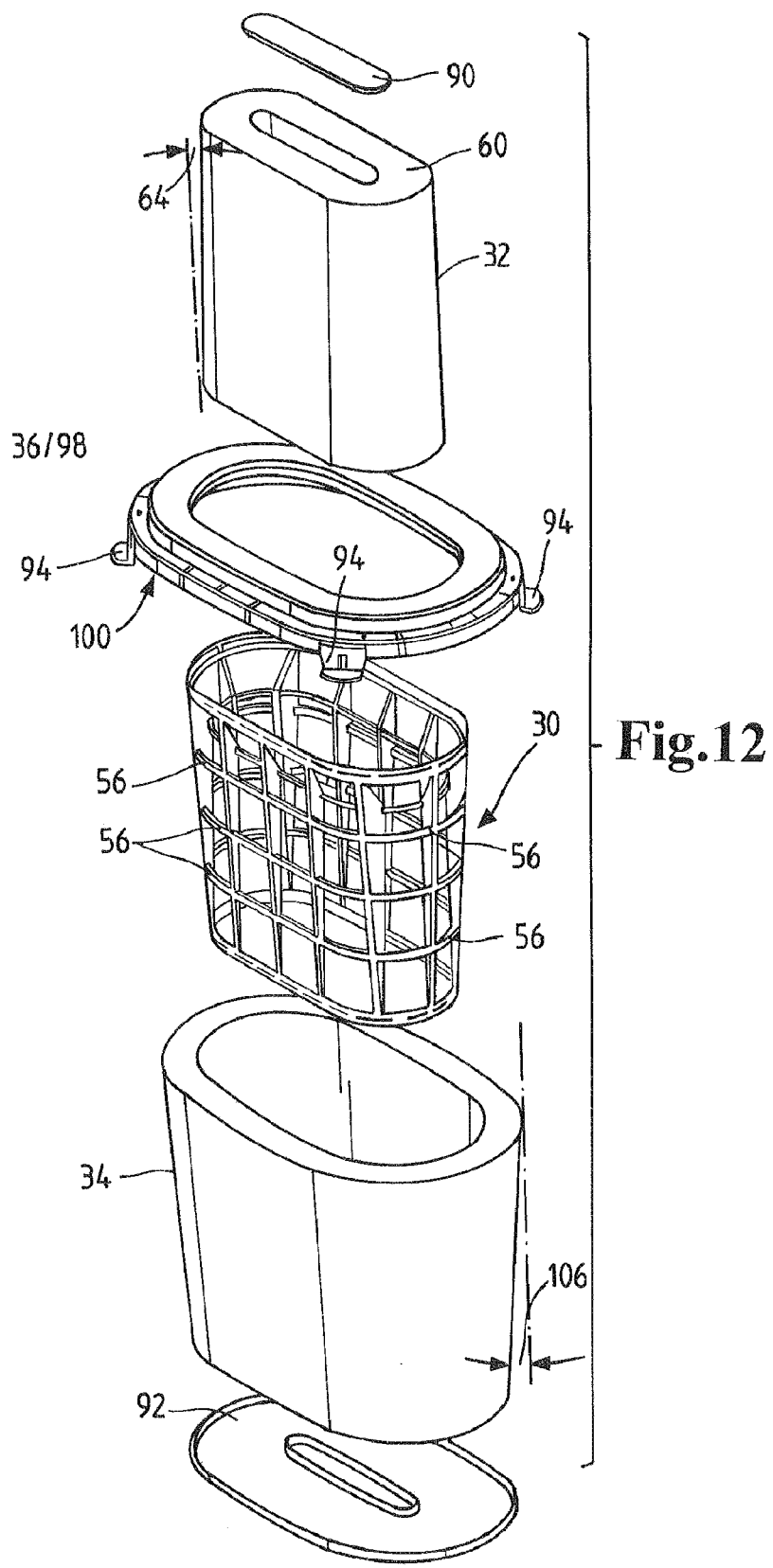
FIG. 12 an exploded illustration of the components of the further second embodiment of the main filter element.

The illustration according to FIG. 12 is an exploded view of the main filter element according to the second embodiment, compare FIGS. 9 through 11.

In the exploded view according to FIG. 12 it is shown that the main filter element 22 comprises the first radially inwardly positioned filter bellows 32 provided with conical shape 64 as well as the second radially outwardly positioned filter bellows 34 that is also possibly provided with an outer conical shape 106. Both filter bellows 32, 34 of the main filter element 22 comprise at their axial end faces the front edge adhesive connection 60. The first radially inwardly positioned filter bellows 32 is closed off at the intake side by the terminal disk 90 (PUR) while at the outflow side the axial end faces of the first radially inwardly positioned filter bellows 32 as well as of the second radially outwardly positioned filter bellows 34, each provided with the front edge adhesive connection 60, are closed off by bottom 92.

The seal 36 illustrated in FIG. 12 is embodied as a two-component synthetic seal. The seal 36 is injection-molded from the first synthetic material 96 with harder, stiffer properties while the recess 100, not illustrated in the exploded view according to FIG. 11, is delimited by the synthetic material 98 that is enclosed by the first synthetic material 96 and has higher elasticity properties.

Between the first radially inwardly positioned filter bellows 32 and the second radially outwardly positioned filter bellows 34 there is a support frame 30 which according to the exploded illustration in FIG. 12 has a plurality of radially and circumferentially extending ribs 56.

The second radially outwardly positioned filter bellows 34, with regard to its outer diameter, can have conical shape 106 as indicated in the exploded illustration according to FIG. 12. In interaction with the filter housing 12 that surrounds the main filter element 22 by means of the conical shape 106 at the outer diameter of the second radially outwardly positioned filter bellows 34 of the main filter element 22 it can achieved that a flow cross-section is produced that extends and widens in the outflow direction in which the flow speed decreases and therefore the noise development can be minimized or at least limited.

In an alternative embodiment the main filter element 22, which is received in the filter housing 12 and comprises the first as well as the second filter bellows 32 and 34, can also be stabilized in that the folds are connected to one another by a circumferentially extending thread that is glued to the tips of the folds.

Figure 13:
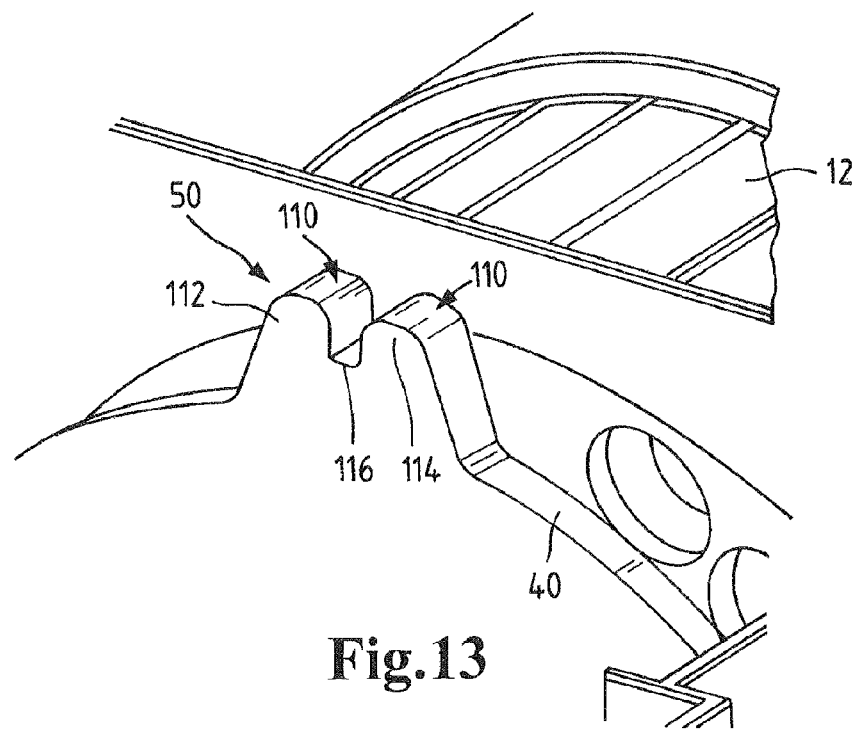
FIG. 13 a view of a divided centering or alignment cam on the circumference of the main filter element.
Figure 14:
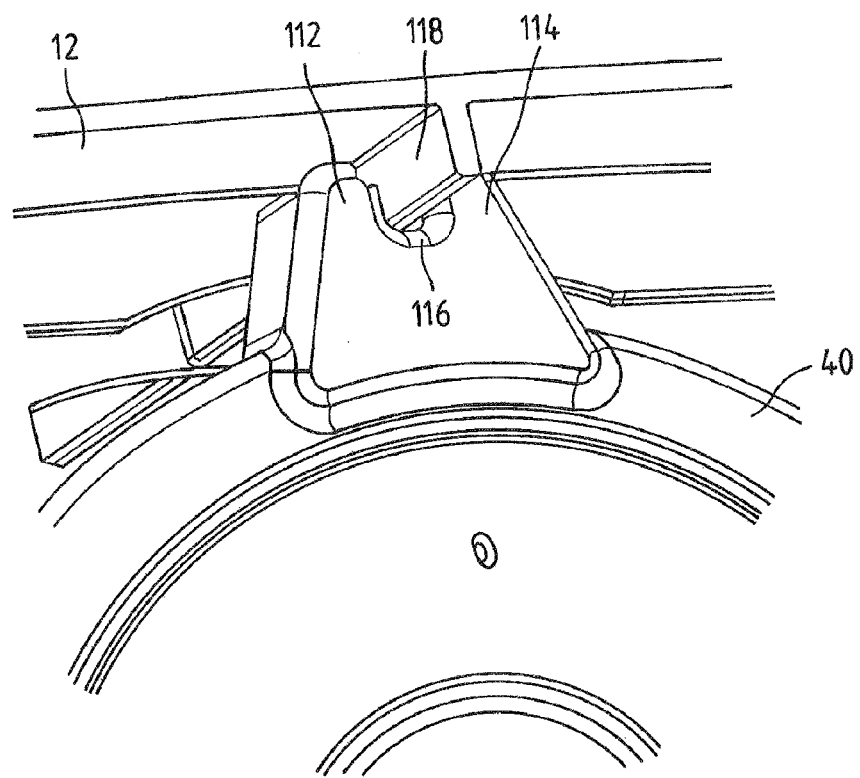
FIG. 14 the divided centering cam surrounding a rib embodied on the filter housing.

The illustration according to FIG. 13 shows a divided cam at the circumference of the cover ring of the main filter element 22. As shown in the illustration according to FIG. 13, a divided cam 110 has a slot 116. In this way, the divided cam 110 engages a first shoulder 112 as well as a second shoulder 114 that extend in the circumferential direction relative to the cover ring 40. The illustration according to FIG. 13 as well as the illustration according to FIG. 14 show that the divided cam 110 on the cover ring 140 is located at the 12 o'clock position. Alternatively it would also be possible to provide the divided cam 110 in the 3 o'clock, 6 o'clock or 9 o'clock position at the circumference of the cover ring 40. By means of the divided cam 110 that interacts with a rib 118 extending within the filter housing 12 a positionally correct installation of the main filter element 22 in the filter housing 12 is ensured.

FIG. 14 shows the rib 118 that is injection-molded on the filter housing 12 and is surrounded by the first shoulder 112 and the second shoulder 114 of the divided cam 110. While by means of the divided cam 112 the positionally correct installation of the main filter element 22 in the filter housing 12 is ensured, the vibrations of the main filter element 22 in the state mounted in the filter housing 12 are dampened by the alignment and centering cams 54 formed on the circumference of the cover ring 40.

The illustration according to FIGS. 15 and 16 show all alignment and centering cams 50, 112 arranged on the circumference of cover ring 40 of the exchangeable main filter element 22. The illustration according to FIGS. 15 and 16 shows that the divided cam 112 is in the 12 o'clock position relative to the cover ring 40, respectively. While FIG. 15 shows the grip depression 52 below the seal 36 of the main filter element 22, the illustration according to FIG. 16 shows the mounted position of the filter element 22 in the filter housing 12. This Figure shows that the cover ring 40 with its alignment and centering cams 15 is supported on the inner side of the filter housing 12 and therefore is dampened relative to vibrations relative to the filter housing 12 and, by means of the divided cam 110, the positionally correct installation of the main filter element 22 in the filter housing 12 is ensured.

The invention claimed is:
1. A filter element for a filter device, comprising:
axially opposing intake side and outflow side;
an intake end face arranged at said intake side at a first axial end of said filter element, said intake end face having an intake opening through which fluid to be filtered enters said filter element;
an outlet end face arranged at an opposing second axial end of said filter element, said outlet end face having an outlet opening through which filtered fluid exits said filter element;
wherein said filter element is embodied as a multi-bellows filter with at least two radially nested filter bellows;
wherein said intake opening and said outlet opening are at opposing axial ends of said filter element;

a first filter bellows construction with filter media folds extending axially between said intake end face and said outlet end face;

wherein said first filter bellows construction radially surrounds and delimits an axially extending first flow space within said first filter bellows construction;

wherein said first flow space is in flow communication with only one of said intake opening or said outlet opening;

a second filter bellows construction with filter media folds extending axially between said intake end face and said outlet end face, said second filter bellows construction arranged radially outwards of and radially surrounding said first filter bellows construction;

wherein a second flow space is defined in a gap between an radially outer surface of said first filter bellows construction and a radially inner surface of said second filter bellows construction;

wherein said second flow space is in flow communication with a different one of said intake opening or outlet opening than said first flow space;

wherein said flow opening at said opposing flow face is an annular flow opening through said opposing flow face in flow communication with said second flow space;

wherein said filter element is a one-piece component inserted into and removed from a filter housing as a single component;

wherein said second filter bellows construction is a star-shaped filter with filter folds arranged in a star shape and on at least one end face of the filter element a seal is arranged between said second filter bellows construction and the filter housing, wherein a third flow space is provided at a radially outer surface of said second filter bellows construction, and wherein said third flow space is in flow connection with said first flow space, such that said first flow space and said third flow space are on same filtered or unfiltered side of said filter element.

2. The filter element according to claim 1, wherein said first filter bellows construction is a star-shaped filter with filter folds arranged in a star shape.

3. The filter element according to claim 1, wherein at least one part of filter folds that immediately neighbor one another have at one axial end face of a filter bellows a front edge adhesive connection securing said annular bottom disk or cover ring and/or said cover disk to said filter bellows.

4. The filter element according to claim 1, wherein the filter bellows are embodied as individual bellows, the filter bellows embodied either conically or cylindrically.

5. The filter element according to claim 1, wherein the second flow space between the filter bellows has a cross-section that increases toward the outflow side of the filter element.

6. The filter element according to claim 1, wherein the second flow space between the filter bellows is framed by a support frame positioned between said first and second filter bellows, said support frame comprising a grid shaped structure of ribs.

7. The filter element according to claim 1, wherein the second flow space forms a clean chamber receiving filtered fluid and is closed off axially relative to the intake side, wherein the filter bellows that radially delimit the flow space each are flown through radially in the direction of the flow space.

8. The filter element according to claim 1, wherein the filter element with filter bellows has axial flow intake through said inflow opening and axial outflow through said axially opposing outflow opening.

9. The filter element according to claim 1, wherein the seal at the outflow side is arranged at a transition between axial end face and radially outwardly positioned wall surface of the filter element.

10. The filter element according to claim 1, wherein the seal is configured to be clamped in the filter housing.

11. The filter element according to claim 9, wherein the seal of the filter element is embodied as a double lip whose individual lips are arranged at a spacing relative to one another.

12. The filter element according to claim 9, wherein the seal is resting and supported upon an annularly extending projection circumferentially surrounding the filter element on the topside of the filter element.

13. The filter element according to claim 1, wherein the seal is embodied as a two-component synthetic seal that has a recess that is delimited by a second synthetic component that has a higher elasticity than the first synthetic component that surrounds the second synthetic component.

14. The filter element according to claim 1, wherein the filter element includes at least one grip depression at the radial exterior of the filter element enabling a one-hand handling or at least one grip member, said grip depression or grip member providing one-handed insertion or removal of said filter element from said filter housing.

15. The filter element according to claim 1, wherein on an annularly embodied cover element securing and centering cams are formed for aligning the filter element in the housing, the centering cams extending radially outwardly from an outer circumference of said cover element.

16. The filter element according to claim 15, wherein the cams are embodied on the cover ring at a division of 90 degrees or 120 degrees or a division different therefrom.

17. The filter element according to claim 1, wherein the radially outwardly positioned one of the filter bellows, embodied as individual bellows, has a conical shape relative to the inner side of the filter housing that enables a radial intake at the outer wall surface of the second radially outwardly positioned filter bellows.

18. The filter element according to claim 1, wherein the seal is manufactured of a thermoplastic elastomer or silicone.

19. The filter element according to claim 1, wherein the filter element further comprises:
an annular bottom disk or cover ring is arranged at and having an outer surface defining either said intake end face or said outlet end face, said annular bottom disk or cover ring secured to and covering and connecting adjacent axial ends of said first and said second filter bellows, said annular bottom disk or cover ring having a respective one of said flow openings therethrough connecting to said first flow space; and
a cover disk arranged an opposing flow face relative to said annular bottom disk or cover ring, said cover disk secured to said first filter bellows at an axial end opposite said annular bottom disk or cover ring, said cover disk closing over and closing off said first flow space at said opposing flow face.

20. The filter element according to claim 19, wherein said annular bottom disk or cover ring is arranged at said intake end face;

wherein said third flow space is formed in the filter housing between said radially outer surface of said second filter bellows and interior wall of the filter housing;

wherein said first flow space of said filter bellows is in flow connection with said intake opening of said intake end face, wherein said third flow space is in flow connection with said intake opening of said intake end face, wherein the fluid to be filtered flows from said first flow space at interior of said first filter bellows radially outwardly through said first filter bellows into said second flow space, and another portion of fluid to be filtered flows from said third flow space radially inwardly through said second filter bellows into said second flow space, wherein said annular flow opening is arranged at said outlet end face, wherein said second flow space is in flow connection with said annular flow opening of said outlet end face.

21. A filter device comprising a filter housing, a main filter element received in the filter housing, a cyclone preseparator embodied as a prefilter and a secondary filter element arranged downstream of the main filter element, the main filter element comprising:
axially opposing intake side and outflow side;
an intake end face arranged at said intake side at a first axial end of said filter element, said intake end face having an intake opening through which fluid to be filtered enters said filter element;
an outlet end face arranged at an opposing second axial end of said filter element, said outlet end face having an outlet opening through which filtered fluid exits said filter element;
wherein said filter element is embodied as a multi-bellows filter with at least two radially nested filter bellows;
wherein said intake opening and said outlet opening are at opposing axial ends of said filter element;
a first filter bellows construction with filter media folds extending axially between said intake end face and said outlet end face;
wherein said first filter bellows construction radially surrounds and delimits an axially extending first flow space within said first filter bellows construction;
wherein said first flow space is in flow communication with only one of said intake opening or said outlet opening;
a second filter bellows construction with filter media folds extending axially between said intake end face and said outlet end face, said second filter bellows construction arranged radially outwards of and radially surrounding said first filter bellows construction;
wherein a second flow space is defined in a gap between an radially outer surface of said first filter bellows construction and a radially inner surface of said second filter bellows construction;
wherein said second flow space is in flow communication with a different one of said intake opening or outlet opening than said first flow space;
wherein said flow opening at said opposing flow face is an annular flow opening through said opposing flow face in flow communication with said second flow space;
wherein said filter element is a one-piece component inserted into and removed from a filter housing as a single component;
wherein said second filter bellows construction is a star-shaped filter with filter folds arranged in a star shape and on at least one end face of the filter element a seal is arranged between said second filter bellows construction and the filter housing,
wherein a third flow space is provided at a radially outer surface of said second filter bellows construction,
wherein said third flow space is in flow connection with said first flow space, such that said first flow space and said third flow space are on same filtered or unfiltered side of said filter element.

* * * * *